March 8, 1960 M. S. ROSENBERGER 2,927,808
SEAL
Filed Nov. 12, 1957
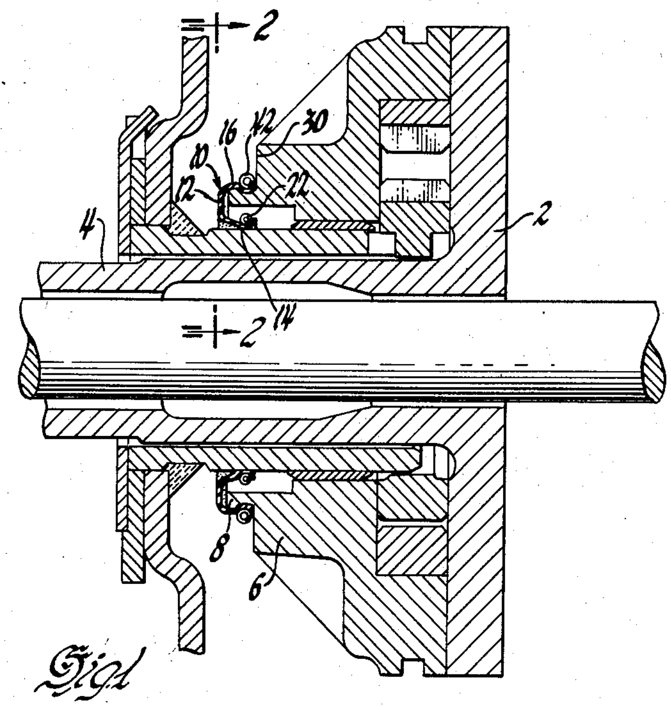
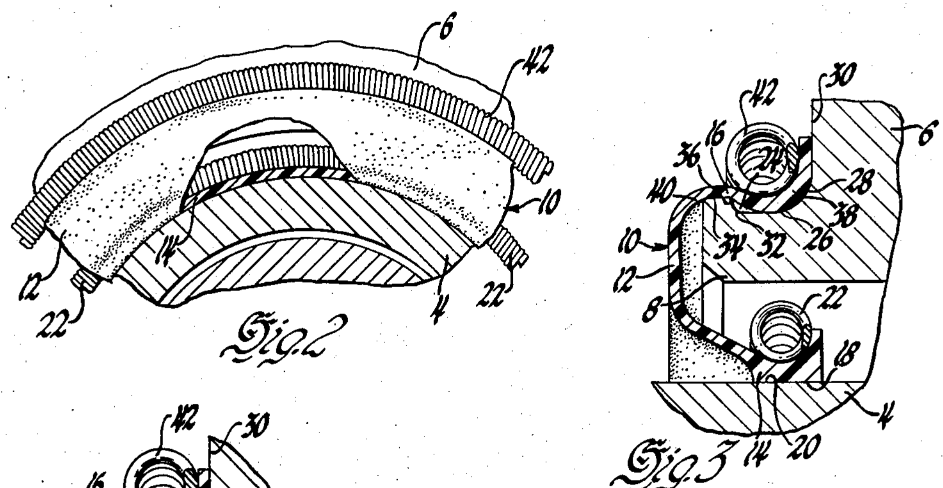
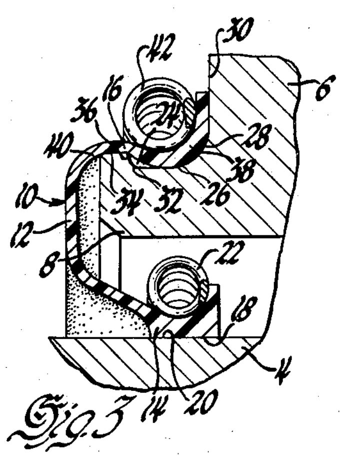
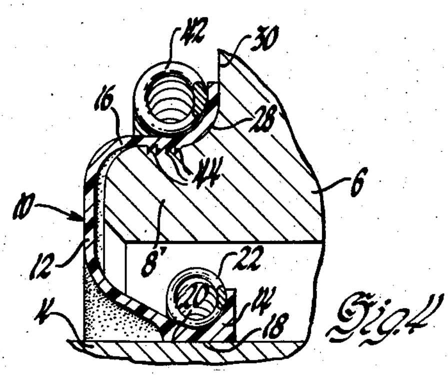
INVENTOR.
Maurice S. Rosenberger
BY
S. C. Thorpe
ATTORNEY United States Patent Office 2,927,808

Patented Mar. 8, 1960

2,927,808

SEAL

Maurice S. Rosenberger, Birmingham, Mich., assignor to General Motors Corporation, Detroit, Mich., a corporation of Delaware Application November 12, 1957, Serial No. 695,858

3 Claims. (Cl. 286—11.16)

This invention relates to new and useful improvements in seals and particularly to types of seals that are used between relatively rotatable parts.

The development of many of the hydraulically operated innovations on the newer automobiles, such as automatic transmissions, power steering, power brakes, etc., has also resulted in the development of new types of seals which are capable of being used under both static and dynamic conditions and which are relatively inexpensive to manufacture and easily and quickly installed. While such seals have proved of great practical value depending upon the dynamic conditions encountered, many of them are still not completely satisfactory for accomplishing the degree of sealing required.

The type of seals with which the present invention is primarily concerned usually comprises an intermediate portion having inner and outer axially extending flanges which are pressed into sealing engagement with the relatively rotatable members by means of garter springs or similar devices, the seal being carried by one member as the other member rotates relative thereto. It has been found in applications of the type of seal outlined above that in order to obtain the proper sealing effect and resist rotation of the seal on its supporting member, it is necessary to utilize relatively strong garter springs or else provide other more expensive methods of fastening. If garter springs are used, however, which is the most desirable manner of fastening, their size and strength are limited by practical considerations such as available space, ease of application, etc.

A primary purpose of the present invention is to anchor one of the flanges of such a seal to one of the parts and to provide adequate sealing junctures between the flange and the one of the parts without materially increasing the sizes of such springs. The above desirable result is accomplished in the present invention by providing an unusual shaped annular groove in the supporting member and also preforming the outer flange of the seal so that line contact is obtained between the outer flange of the seal and the supporting member at one point. A substantial surface area of contact between the outer flange of the seal and the supporting member is obtained at a location axially spaced from the line contact between the seal and the support and the outer flange is anchored on the support by means of a garter spring which is of sufficient diameter so that the outer flange does not completely penetrate the groove. This particular arrangement in combination with the dimensions chosen and the configuration of the groove and the outer flange of the seal not only serves to improve the anchoring of the seal on the supporting member against rotation, but, in addition, provides an unusually efficient line contact sealing juncture in combination with a second surface area sealing juncture to enhance the effectiveness of the seal between the outer flange thereof and the supporting member.

For a further understanding of the invention and the above and other objectives thereof, reference may be made to the accompanying detailed description and drawings in which:

Fig. 1 is a view in elevation with parts in section of a portion of an automatic transmission having the unique seal between relatively rotatable parts thereof.

Fig. 2 is a view taken substantially on the line 2—2 of Fig. 1 with portions in section and broken away, further illustrating the unique seal and its relation to the parts which it is particularly adapted to seal.

Fig. 3 is an enlarged fragmentary view of a portion of Fig. 1 showing in much greater detail the specific configuration of a cross-section of the seal including the groove in the outer annular support in which the outer flange is sealingly mounted.

Fig. 4 illustrates a modification of the seal wherein, instead of a single groove being provided in the supporting member, a plurality of axially spaced saw-toothed grooves are provided into which the outer flange of the seal is pressed by means of the anchoring constrictive garter spring.

Referring now to the drawing and particularly to Figures 1, 2, and 3, in order to illustrate an application of the seal, a portion of an automotive automatic transmission has been shown which includes relatively rotatable parts and for which the seal is particularly adapted. That portion of the transmission which is necessary for an understanding of the invention includes a stationary supporting portion 2 which has journaled therein for rotation relative thereto a hollow shaft member 4. The portion 2 includes a ribbed necked-down cylinder section 6 having an axially extending projection 8.

The seal itself is indicated generally by a numeral 10 and comprises a radially disposed intermediate portion 12 which is provided with an inner sealing flange 14 and an outer sealing flange 16, both of which extend in the same axial direction from the intermediate portion 12. The inner flange 14 of the seal 10 has an inner seal surface 18 forming an inner cylindrical surface which is maintained in rotatable sealing engagement with the outer peripheral surface 20 of the hollow shaft member 4 by a helical coil garter spring 22. The inner flange 14 of seal 10 is formed on its outer side so that the turns of the garter spring 22 fair smoothly and are concentric therewith so as to provide a relatively wide evenly distributed sealing contact area between the surfaces 18 and 20.

As previously mentioned in the introduction of this specification, one of the difficulties occurring with seals of the type shown and described herein has been that there is a tendency for the seal, unless properly secured on one of the relatively rotatable parts, to move relative to both of the relatively rotating parts, thereby reducing the effectivenss of the seal between the seal and one or both of the parts. This invention has been made to obviate this difficulty by a special means for anchoring the outer flange 16 to the axially extending projection 8 of the necked down portion to substantially improve the anchoring of the seal while at the same time substantially improving the effectiveness of the seal between the seal and the part on which it is supported.

Referring particularly to Fig. 3, it will be observed that the projection 8 in its outer periphery is provided with an outwardly facing groove 24 which in cross-section is of a rather unusual configuration. This groove includes a flat base portion 26 which in cross-section extends axially and fairs smoothly with a circular arcuate section 28 terminating in a vertical radially extending wall 30, the arcuate section 28 having a relatively large radius of curvature. The base portion 26 extending axially in the opposite direction from the arcuate portion 28 terminates in a second curved portion 32 which has a relatively small radius of curvature and which terminates in combination with a small flat section 34 in an apex or relatively sharp edge 36. The outer flange 16 is more or less preformed so that the portion 38 adjacent the free end thereof is concentric with and fairs smoothly with the arcuate portion 28 and the free end terminates along the edge of the wall 30. The inner part 40 of the flange 16 is formed so that it substantially engages the surface 34 and is "bitten" into by the edge 36. To securely anchor and retain the flange 16 in the groove 24 and to assure proper "biting" of the edge 36 into the flange 16, a helical coil garter spring 42 is provided whose diameter is such that complete penetration of the flange 16 into the groove 24 is prevented. By dimensioning, forming, and arranging the groove 24 and the outer flange 16 and the spring 30 in the manner herein described, it will be appreciated that the flange 16 engages the projection 8 along a line of surface contact which "bites" into the seal and substantially increases the frictional resistance to slipping of the seal on the support 2 which is supplemented by the axially spaced annular area of surface contact which is provided between the portion 38 of the seal and the curved surface 28. The "biting" into of the flange 16 by the edge 40 substantially enhances the effectiveness of the seal which again is supplemented by the surface area of contact between the portion 38 and the curvature 28.

The modification shown in Fig. 4 is similar to that of Fig. 3 in conventional respects and in those cases the same numerals used in connection with the embodiment of Fig. 3 have been used in the modification of Fig. 4. It will be observed, however, that the manner of anchoring the flange 16 of the modification of Fig. 4 is somewhat different. The projection 8, instead of being provided with a single relatively large groove, has provided in its outer periphery a plurality of saw-toothed grooves 44. Axially spaced from these grooves 44 is the curved portion 28 similar to that shown in Fig. 3 which engages the free end of the flange 16 and is faired smoothly therewith. The garter spring 42 in the modification of Fig. 4 again is constrictive in nature and presses the material of the flange 16 into the grooves 44 so as to increase the surface area of contact between flange 16 and the projection 8, thereby substantially increasing the frictional resistance to slipping of the seal on the support while at the same time substantially enhancing the effectiveness of the seal by reason of the plurality of sealing junctures caused by the saw teeth 44 "biting" into the flange 16.

I claim:

1. A seal comprising an annular one-piece sealing element having an intermediate portion and inner and outer sealing flanges extending in the same axial direction from said intermediate portion, an annular support between said flanges, said annular support having an annular groove therein facing the outer periphery thereof, said groove in cross-section including a relatively flat base portion and a radially extending side and a circular arcuate portion of relatively large radius of curvature fairing into said base portion and said side and a second curved portion faired into said base portion and having a relatively small radius of curvature and opposite said circular arcuate portion, said second curved portion terminating in an apex defining an annular diagonally outwardly extending sharp edge, and an annular constrictive spring circular in cross-section surrounding the outer of said sealing flanges holding said outer flange seated in said groove so that said outer flange engages said edge and a portion of said base and curvature of relatively large radius to thereby provide line contact with said seal at said apex and a surface area of contact between the seal and said groove spaced axially from each other.

2. A seal comprising an annular one-piece sealing element having an intermediate portion and inner and outer sealing flanges extending in the same axial direction from said intermediate portion, an annular support between said flanges, said annular support having an annular groove therein facing the outer periphery thereof, said groove in cross-section including a relatively flat base portion and a circular arcuate portion of relatively large radius of curvature fairing into said base portion and into a radially extending side and a second curved portion faired into said base portion and having a relatively small radius of curvature and opposite said circular arcuate portion, said latter curved portion terminating in an apex defining an annular diagonally outwardly extending sharp edge, said outer sealing flange being preformed so that in cross-section in said groove the thickness thereof is concentric with said curvature of relatively large radius and in contact with said edge but not said surface of relatively small radius of curvature and an annular constrictive spring circular in cross-section and of sufficient diameter to prevent complete penetration of said outer flange into said groove surrounding the outer of said sealing flanges adjacent to the free edge thereof and holding said outer flange in said groove so that said outer flange is "bitten" into by said edge and engages an annularly spaced surface area of said groove axially removed from said edge.

3. In combination with concentric relatively rotatable parts including an inner cylindrical shaft and an outer annular support, a seal therebetween comprising an annular one-piece sealing element having an intermediate portion extending radially between said parts and having radially spaced inner and outer sealing flanges extending in the same axial direction from said intermediate portion, said support having an annular groove therein facing the outer periphery thereof, said groove in cross-section including a relatively flat base portion and a radially extending side and a circular arcuate portion of relatively large radius of curvature fairing into said base portion and said side and a second curved portion faired into said base portion and having a relatively small radius of curvature and opposite said circular arcuate portion, said second curved portion terminating in an apex defining an annular diagonally outwardly extending sharp edge, and an annular constrictive garter spring surrounding each of said sealing flanges adjacent to the free edge thereof one of said springs being of sufficient diameter to prevent complete penetration of said outer flange and the one of said springs into said groove to obtain sealing line contact between said edge and said outer flange and a substantial area of surface contact between said outer flange and said support axially spaced from said edge to provide increased frictional resistance to slipping of said seal on said support and dual sealing junctures between said outer flange and said support, the other of said springs holding said inner flange seated on and in sealing engagement with said shaft entirely around the circumference thereof.

References Cited in the file of this patent

UNITED STATES PATENTS

| | | |
|---|---|---|
| 2,626,822 | Boyd | Jan. 27, 1953 |
| 2,713,504 | Coleman | July 19, 1955 |
| 2,720,431 | Browne et al. | Oct. 11, 1955 |

OTHER REFERENCES

Service Instruction Manual, Triump TR–2 Series 1954, 3rd. ed.; Standard Motor Co., Ltd., Coventry, Eng.; printed in England by W. W. Curtis Ltd., Coventry, Eng.; Sec. D, page 6. (Copy in 286/11 (1).)